United States Patent
Ilyadis et al.

(10) Patent No.: US 9,432,332 B2
(45) Date of Patent: **\*Aug. 30, 2016**

(54) PROXY DEVICE FOR A NETWORK OF DEVICES

(71) Applicant: BROADCOM CORPORATION, Irvine, CA (US)

(72) Inventors: Nicholas Ilyadis, Merrimack, NH (US); John Stuart Walley, Ladera Ranch, CA (US); Stephen Wilson Bailey, Irvine, CA (US); Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,322

(22) Filed: Oct. 26, 2015

(65) Prior Publication Data

US 2016/0050180 A1 Feb. 18, 2016

Related U.S. Application Data

(63) Continuation of application No. 14/161,621, filed on Jan. 22, 2014, now Pat. No. 9,203,803.

(60) Provisional application No. 61/922,554, filed on Dec. 31, 2013, provisional application No. 61/904,432, filed on Nov. 14, 2013.

(51) Int. Cl.
*H04L 29/06* (2006.01)

(52) U.S. Cl.
CPC ....... *H04L 63/0254* (2013.01); *H04L 63/0227* (2013.01); *H04L 63/0281* (2013.01); *H04L 63/0421* (2013.01); *H04L 63/102* (2013.01)

(58) Field of Classification Search
CPC  H04L 63/0227; H04L 63/0281; H04L 63/30
See application file for complete search history.

(56) References Cited

U.S. PATENT DOCUMENTS

2004/0162871 A1* 8/2004 Pabla .................... H04W 8/005
709/201

OTHER PUBLICATIONS

"Machine to Machine", retrieved from <http://en.wikipedia.org/w/index.php?title=Machine_to_machine&oldid=578252152, Oct. 22, 2013, 6 pgs.
"Internet of Things", retrieved from <http://en.wikipedia.org/w/index.php?title=Internet_of_Things&oldid=579804668, Nov. 1, 2013, 10 pgs.
Diab, "A Telecommunication View of IoT with M2M and 802 Technology Perspectives", Apr. 11, 2013, 36 pgs., IEEE-SA Shenzhen IoT Workshop, Shenzhen, China.

* cited by examiner

Primary Examiner — Izunna Okeke
(74) Attorney, Agent, or Firm — McDermott Will & Emery LLP (57) ABSTRACT

A proxy device for a network of devices may include memory, a device status module, a data intercept module, a network interface, and an emulation module. The memory may be configured to store an emulation policy for emulating a device in a network, where the policy includes a status criterion that indicates a status of the device for which the policy applies. The device status module may be configured to monitor the status of the device. The data intercept module may be configured to intercept action requests directed to the device. The network interface may be configured to forward the intercepted action requests to the device when the status of the device fails to satisfy the status criterion. The emulation module may be configured to emulate the device, and respond to the action request without accessing the device, when the status of the device satisfies the status criterion.

18 Claims, 5 Drawing Sheets

PROXY DEVICE FOR A NETWORK OF DEVICES

CROSS-REFERENCE TO RELATED APPLICATIONS

The present application is a continuation of U.S. patent application Ser. No. 14/161,621, entitled "Proxy Device for a Network of Devices," filed on Jan. 22, 2014, now issued as U.S. Pat. No. 9,203,803, which claims the benefit of U.S. Provisional Patent Application Ser. No. 61/922,554, entitled "Proxy Device for a Network of Devices," filed on Dec. 31, 2013, and U.S. Provisional Patent Application Ser. No. 61/904,432, entitled "Interoperable Devices," filed on Nov. 14, 2013, all of which are hereby incorporated by reference in their entireties for all purposes.

TECHNICAL FIELD

The present description relates generally to a proxy device, and more particularly, but not exclusively, to a proxy device for a network of devices.

BACKGROUND

According to some estimates, more than 30 billion devices will be capable of being connected by 2020. These devices may include sensor devices, wearable devices, computing devices, and the like. Many of these devices may operate, either permanently or transiently, within a network that includes other such devices. The devices may be interoperably configurable to collectively perform one or more tasks, e.g. on behalf of a user and/or an application, and therefore may be referred to as interoperable devices. Thus, networks may include a large number of interoperable devices, and there may be a significant complexity associated with managing such devices, e.g. in conjunction with performing a task requested by an application and/or a user.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system, a network, such as a local area network, may include an proxy device, such as a gateway device, that acts as a proxy for devices, such as interoperable devices, that operate, permanently or transiently, from as part of the local area network. The proxy device may receive data from the devices within the local area network, and may transmit the data to applications (internal or external to the local area network), agents, devices, etc. In order to conserve network resources, the proxy device may transmit data received from the devices in the local area network in aggregate, may buffer the data and transmit the data only when it is requested, may transmit a summarization of the data, and/or may transmit the data during off-peak hours. The summarization/aggregation of the received data by the proxy device may be local to the local area network below the proxy device and/or may be application driven.

The proxy device may also emulate the behavior of one or more of the devices in the network such that the devices appear, e.g. to an application and/or other devices, to be connected and/or online, even though the devices may be, for example, sleeping or in a low-power mode. In one or more implementations, the proxy device may intercept action requests, such as data requests, addressed to, and/or intended for, one or more devices that are being emulated by the proxy device, and the proxy device may respond to the action requests on behalf of the devices. For example, the proxy device may respond to a data request intended for a device in the network by transmitting cached data to the requesting application/device, where the cached data was previously received and/or retrieved from the device. In one or more implementations, the proxy device may also respond to an action request addressed to a device in the network by performing the requested action on behalf of the device. Thus, a device that is being emulated by the proxy device may not be activated, e.g. powered on, for every action request addressed to the device, which may facilitate a low power operation of the device while also reducing data traffic over the network.

Figure 1:
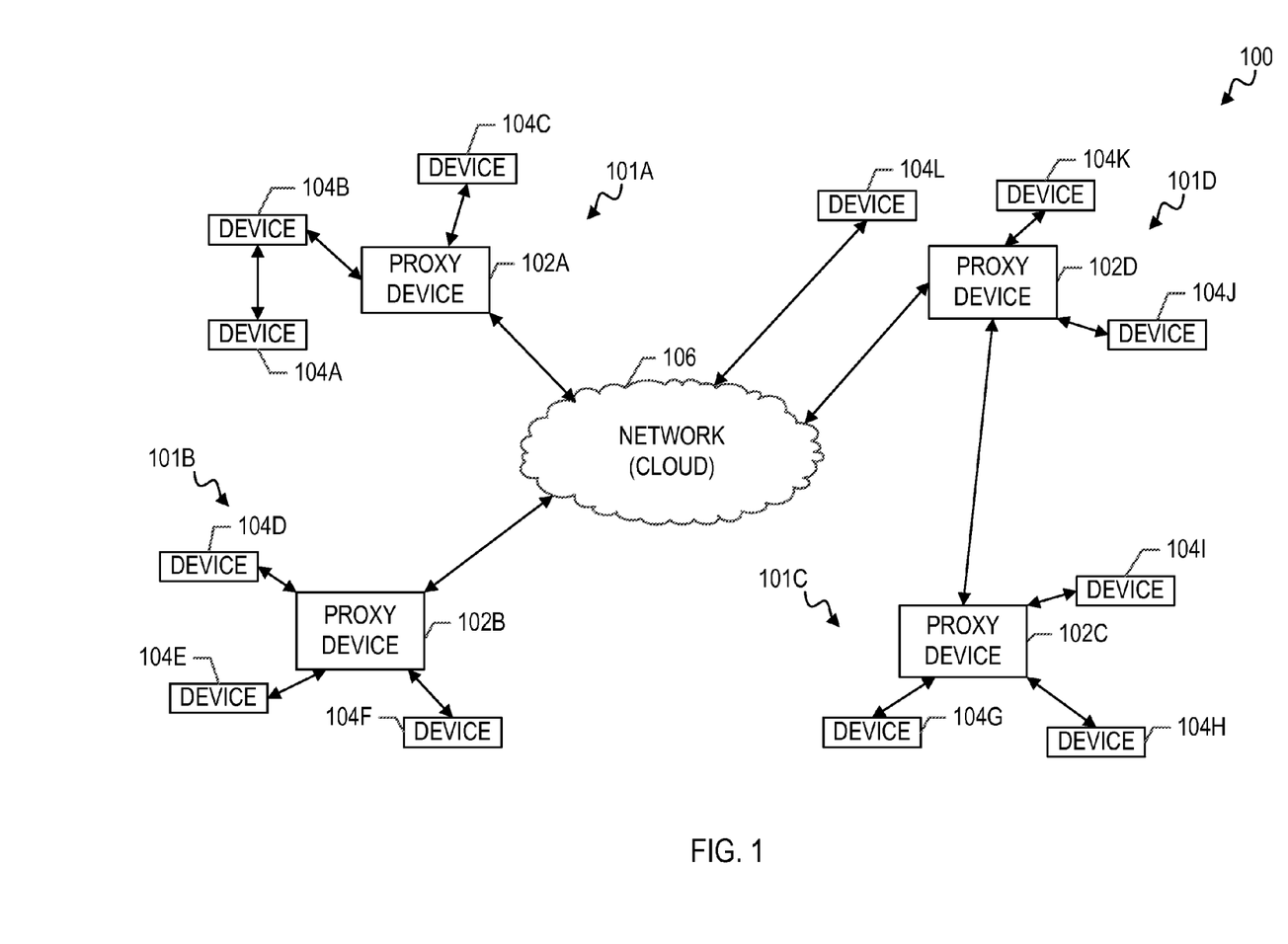
FIG. 1 illustrates an example network environment that may implement one or more proxy devices for one or more networks of devices in accordance with one or more implementations.

FIG. 1 illustrates an example network environment 100 that may implement one or more proxy devices 102A-D for one or more networks 101A-D of devices 104A-L in accordance with one or more implementations. Not all of the depicted components may be used, however, and one or more implementations may include additional components not shown in the figure. Variations in the arrangement and types of the components may be made without departing from the spirit or scope of the claims as set forth herein. Additional, different or fewer components may be provided.

The example network environment 100 includes devices 104A-L and proxy devices 102A-D that collectively form, and/or are a part of, one or more of the networks 101A-D. The example network environment 100 also includes a network 106. The network 106 and/or one or more of the networks 101A-D may include, and/or may be communicatively coupled to, one or more of the Internet, a private network, an internet of things network, or other networks. The network 106 and/or one or more of the networks 101A-D may include one or more wired or wireless network devices that facilitate device communication, such as switch devices, router devices, relay devices, etc., and/or may include one or more servers. In one or more implementations, the network 106 and/or one or more of the networks 101A-D, may be, or may include, a cloud of computers. In one or more implementations, the network 106, and/or one or more of the networks 101A-D, may be referred to as an internet of things (IOT) network and/or a machine-to-machine (M2M) network. In one or more implementations, one or more of the devices 104A-L may be referred to as an IOT device and/or an M2M device.

In one or more implementations, one or more of the devices 104A-L may include, or may be, a sensor device that may be configured to measure a physical quantity and convert the physical quantity into a signal. In one or more implementations, the devices 104A-L may include temperature sensors, video cameras, audio recorders, motion sensors, humidity sensors, smoke detectors, various gas sensors, radiation monitors, security sensors, such as door and/or window sensors, biometric sensors, wearable devices/sensors, implantable devices/sensors, embedded devices/sensors and/or any other devices/sensors. In some aspects, a sensor device may be a smart sensor that includes, but is not limited to, processing logic such as one or more controllers or processors, memory, and communication interfaces. In one or more implementations, one or more of the devices 104A-L may include, may be embedded in, and/or may be communicatively coupled to a portable device such as a portable communication device including a mobile phone, a laptop, a tablet, or any other communication device. In one or more implementations, one or more of the devices 104A-L may be action devices, such as actuators, alarm devices, automated devices, or any other devices that are capable of performing one or more actions.

In one or more implementations, one or more of the devices 104A-L, such as the device 104A, may be any device that is capable of communicating with one or more of the other devices 104B-L, the proxy devices 102A-D, and/or the network 106. In one or more implementations, one or more of the devices 104A-L may be communicatively coupled to one or more of the proxy devices 102A-D and/or the network 106 through one or more of the other devices 104A-L. In FIG. 1, the device 104A, such as a smart watch, may be communicatively coupled to the device 104B, such as a mobile phone, via a first network connection, such as a Bluetooth connection, and the device 104B may be communicatively coupled to the proxy device 102A via a second network connection, such as a WiFi network connection. Thus, the device 104A may be communicatively coupled to the proxy device 102A via a combination of the first network connection between the device 104A and the device 104B and the second network connection between the device 104B and the proxy device 102A. In one or more implementations, the network connection between the device 104A and the proxy device 102A, may be referred to as a transient network connection and/or a dependent network connection, since the network connection depends on the device 104B being proximally located to the device 104A, e.g. within Bluetooth range of the device 104B.

In one or more implementations, one or more of the devices 104A-L may be communicatively coupled to the network 106 through one or more of the proxy devices 102A-D, and/or one or more of the devices 104A-L may be communicatively coupled to one or more of the proxy devices 102A-D through the network 106. In FIG. 1, the device 104L may be associated with the network 101D and/or part of the network 101D on a transient basis, but located externally to network 101D, and therefore may be communicatively coupled to the proxy device 102D via the network 106.

One or more of the proxy devices 102A-D may include one or more wired or wireless network devices that facilitate device communication, such as router devices, switch devices, relay devices, etc. In one or more implementations, one or more of the proxy devices 102A-D may include, and/or may be coupled to, multiple different network interfaces, such as a WiFi network interface, a Bluetooth network interface, a coaxial network interface, an Ethernet network interface, an optical network interface, or generally any interface that facilitates communicatively coupling one or more of the proxy devices 102A-D with one or more of the devices 104A-L. In one or more implementations, the proxy devices 102A-D may be, or may include, home gateway devices such as set top boxes (STBs). In one or more implementations, one or more of the proxy devices 102A-D may be a device that is communicatively coupled to one or more of the networks 101A-D, but does not facilitate communication for the devices 104A-L of the networks 101A-D.

In one or more implementations, one or more of the proxy devices 102A-D may be communicatively coupled to one or more of the devices 104A-L through one or more of the networks 101A-D. For exemplary purposes, the networks 101A-D are illustrated as each including multiple of the devices 104A-L; however, one or more of the networks 101A-D may include only one of the devices 104A-L. In one or more implementations, one or more of the networks 101A-D may be, or may include, one or more of a bus network, a star network, a ring network, a relay network, a mesh network, a star-bus network, a tree or hierarchical network, and the like. In FIG. 1, the proxy device 102A may form the network 101A with the devices 104A-C, the proxy device 102B may form the network 101B with the devices 104D-F, the proxy device 102C may form the network 101C with the devices 104G-I, and the proxy device 102D may form the network 101D with the devices 104J, K. In one or more implementations, there may be multiple paths between one or more of the proxy devices 102A-D and the devices 104A-L. In one or more implementations, there may be multiple paths between one or more of the devices 104A-L and/or the proxy devices 102A-D, and the network 106.

In one or more implementations, one or more of the proxy devices 102A-D, such as the proxy device 102A, may be communicatively coupled to one or more of the devices 104A-L, such as the device 104A, through one or more of the other devices 104B-L, such as the device 104B. In one or more implementations, one or more of the proxy devices 102A-D, such as the proxy device 102D, may be communicatively coupled to one or more of the devices 104A-L, such as the devices 104G-I, through one or more of the other proxy devices 102B-D, such as the proxy device 102C. In one or more implementations, one or more of the proxy devices 102A-D, such as the proxy device 102D, may be communicatively coupled to one or more of the devices 104A-L, such as the device 104L, through the network 106. In one or more implementations, one or more of the proxy devices 102A-D, such as the proxy device 102C, may be communicatively coupled to the network 106 through one or more of the other proxy devices 102A, B, D, such as the proxy device 102D.

In one or more implementations, one or more of the networks discussed herein may refer to the network 106, a portion of the network 106, one or more of the networks 101A-D, and/or a portion of one or more of the networks 101A-D. In one or more implementations, the proxy devices discussed herein may refer to one or more of the proxy devices 102A-D and/or a portion of one or more of the proxy devices 102A-D. In one or more implementations, the devices discussed herein may refer to one or more of the devices 104A-L, and/or a portion of one or more of the devices 104A-L. In view of the large number of devices 104A-L that may be part of, and/or associated with, the networks 101A-D, and the associated complexity of managing and/or communicating with the devices 104A-L, one or more of the proxy devices 102A-D may operate as a proxy for the devices 104A-L that are part of, and/or associated with the networks 101A-D.

One or more of the devices 104A-L may be configured to transmit data, such as data generated from measured physical quantities, in different formats and/or at different times, such as at periodic intervals, e.g. every millisecond, every second, every minute, etc., on a periodic basis based at least in part on operating parameters/variables of one or more of the devices 104A-L, e.g. power constraints, at times determined based at least in part on fluctuations in measured physical quantities, at times determined based at least in part on network connection availability, such as transient network connection availability, and/or at times determined based at least in part on network bandwidth availability, such as during off-peak hours. In order to conserve network resources, instead of forwarding data transmitted by one or more of the devices 104A-L (e.g. external to the networks 101A-D) at the time that the data is received by one or more of the proxy devices 102A-D, such as every millisecond, the proxy devices 102A-D may intercept data transmitted by one or more of the devices 104A-L, e.g. at different times, cache and aggregate the intercepted data, and subsequently forward the intercepted data, e.g. in aggregate, when the data is requested by an application and/or device, at less frequent intervals, and/or at different times (e.g. off-peak hours), than the data is being transmitted by the devices 104A-L. In one or more implementations, one or more of the proxy devices 102A-D may also compress the aggregated data.

One or more of the devices 104A-L may have limited or no processing resources and therefore may have limited configurability with respect to the amount of data generated and/or transmitted. Thus, one or more of the devices 104A-L may generate and/or transmit a large amount of data, some of which may be redundant and/or of low value. For example, a temperature sensor may transmit temperature data every millisecond, even when the temperature is substantially constant for an extended period of time, such as several thousand milliseconds. Similarly, a door sensor may transmit a value every millisecond that indicates whether the door is open or closed, even when the door remains closed for an extended period of time, such as several million milliseconds. Thus, in order to conserve network resources, one or more of the proxy devices 102A-D may filter, and/or otherwise process, data intercepted and/or received from one or more of the devices 104A-L, e.g. in accordance with a policy. For example, one or more of the proxy devices 102A-D may filter the received temperature data and/or door sensor data that is redundant.

In one or more implementations, one or more of the devices 104A-L may have a limited power supply and therefore may only have sufficient power to transmit data on a periodic basis, such as a daily basis. For example, one or more of the devices 104A-L may be solar-powered and may charge via one or more solar panels for a period of time, such as a day, in order to generate enough power to transmit data to one or more of the proxy devices 102A-D and/or the network 106. Similarly, one or more of the devices 104A-L may be connected to one or more of the proxy devices 102A-D, and/or the network 106, via a transient network connection and therefore may have limited and/or intermittent network availability. Thus, one or more of the devices 104A-L may not be available to respond to an action request and/or a data request from an application and/or device. However, one or more of the proxy devices 102A-D may emulate one or more of the devices 104A-L when the devices 104A-L, such as when the devices 104A-L are unavailable. In this manner, the devices 104A-L may appear online to requesting applications and/or devices, even when the devices 104A-L are offline, in low power mode, and/or are otherwise unavailable.

In one or more implementations, one or more of the proxy devices 102A-D may store a state, or status, of the devices 104A-L that are part of, and/or associated with, the networks 101A-D of the proxy devices 102A-D, respectively. The states of the devices 104A-L may include, for example, offline, online, low-power mode, sleep mode, intermittent network availability mode, etc. One or more of the proxy devices 102A-D, such as the proxy device 102A, may intercept action requests intended for one or more of the devices 104A-L, such as the device 104A, determine if the intended device 104A is in a state in which the device 104A can respond to an action request, forward the action request to the device 104A when the device 104A is in a state to respond to the action request, or respond to the action request on behalf of the device 104A when the device 104A is not in a state in which the device 104A can respond to the action request. The proxy device 102A may respond to the action request in such a manner that it appears to the requesting application and/or device that the device 104A responded to the action request. For example, the proxy device 102A may intercept a data request and respond with cached data that was previously received from the device 104A and using a network identifier associated with the device 104A as the source network identifier.

In one or more implementations, the proxy device 102A may manipulate the cached data to provide estimated data, such as data estimated based at least on statistical models generated by the proxy device 104A over time based at least on data previously received from the device 104A, and/or data previously received from devices 104B-L similar to, and/or in a similar operating environment as, the device 104A. In one or more implementations, the proxy device 102A may be located remotely from the devices 104A, such as in a data center and/or in a cloud of computers, and the proxy device 102A may be configured to remotely intercept action requests intended for the device 104A.

In one or more implementations, one or more of the devices 104A-L may generate sensitive and/or personal data, such as biometric and/or biomedical data, and/or data from which an individual person, or household, may be identifiable. The biometric data may be transmitted to multiple different applications and/or devices, such as an application associated with a healthcare provider treating the individual person, and/or an application associated with an insurance provider for the individual person. The individual person may permit the biometric data to be transmitted to the healthcare provider in an identifiable format; however the individual person may only permit the biometric data to be provided to the insurance provider in a non-identifiable format. Thus, one or more of the proxy devices 102A-D may be configurable to apply privacy policies, e.g. on a per application/device basis, to the data generated by one or more of the devices 104A-L. In one or more implementations, one or more of the proxy devices 102A-D may provide datagram based privacy, e.g. privacy on each individual packet.

In one or more implementations, one or more of the devices 104A-L, such as the device 104K, may include, and/or may be, a portable device, such as a mobile device, a wearable device, or any other device that may not always be located within the network 101D and/or directly coupled to the proxy device 102D. Thus, when the device 104K is not located within the network 101D and/or directly coupled to the proxy device 102D, or when the proxy device 102D is located remotely from the network 101D, the proxy device 102D may receive and store the data from the device 104K forwarded through one or more of other networks 106, 101A-C, and/or devices 104A-J that the device 104K is communicatively coupled to. In this manner, one of the proxy devices 102A-D, such as the proxy device 102D can monitor the status of, and/or respond to action requests on behalf of, the device 104K, even when the device 104K is not located within the network 101D.

Figure 2:
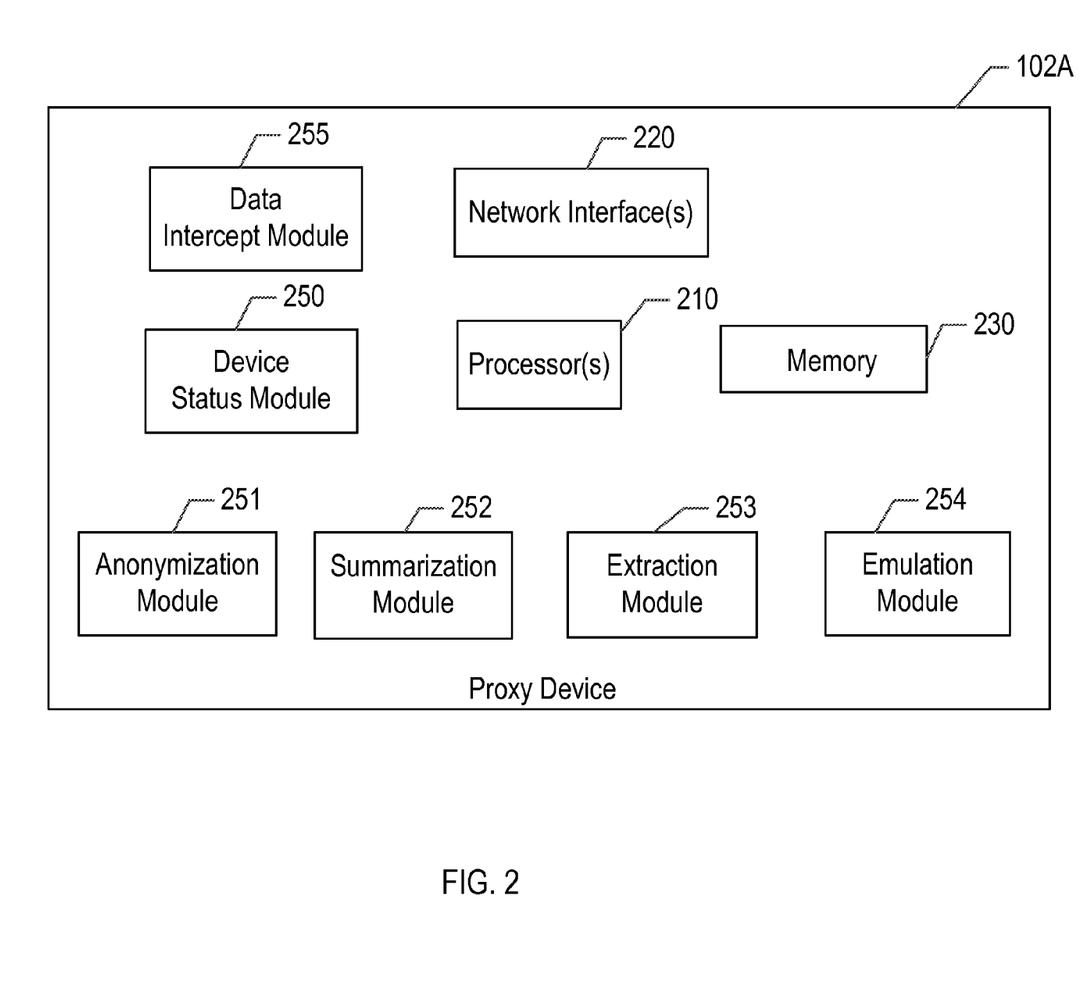
FIG. 2 illustrates an example proxy device for a network of devices in accordance with one or more implementations.

FIG. 2 illustrates an example proxy device 102A for a network of devices in accordance with one or more implementations. Not all of the depicted components may be used, however, and one or more implementations may include additional components not shown in the figure. Variations in the arrangement and type of the components may be made without departing from the spirit or scope of the claims as set forth herein. Additional components, different components, or fewer components may be provided.

For explanatory purposes, the proxy device illustrated in FIG. 2 is depicted as the proxy device 102A of FIG. 1. However, the proxy device illustrated in FIG. 2 may also be, or may include all or part of, one or more of the other proxy devices 102B-D of FIG. 1. In one or more implementations, the proxy device 102A may be, or may include all or part of, one or more routing devices, switch devices, relay devices, etc.

The proxy device 102A includes one or more processing unit(s) (e.g., processor (s)) 210, one or more network interface(s) 220, a memory 230, a device status module 250, an anonymization module 251, a summarization module 252, an extraction module 253, an emulation module 254, a data intercept module 255, and/or subsets and variations thereof. The network interface 220 may include cellular interfaces, WiFi interfaces, Infrared interfaces, radio frequency identification (RFID) interfaces, ZigBee interfaces, Bluetooth interfaces, Ethernet interfaces, coaxial interfaces, optical interfaces, or generally any communication interface that may be used for device communication. The memory 230 may be, and/or may include, random access memory, such as dynamic random access memory, and/or the memory 230 may be, and/or may include, any other memory, such as a hard drive.

The proxy device 102A may cache data received from the devices 104A-C and/or processed by one or more of the modules 250-255, in the memory 230. The memory 230 may also store one or more policies that may be implemented by one or more of the modules 250-255, such as privacy (or anonymization) policies, summarization policies, filtering policies, emulation policies, or generally any policies that may be implemented by one or more of the modules 250-255. The memory 230 may also store one or more data structures, such as lookup tables, that may be utilized by one or more of the modules 250-255 and/or other components of the proxy device 102A. The lookup tables may include a status table that indicates a status of the devices 104A-C that are communicatively coupled to, e.g. permanently or transiently, and/or associated with, the proxy device 102A. The lookup tables may also include a device location table that may include network identifiers of the devices 104A-C and/or may indicate network paths for communicating with the devices 104A-C. The device location table may also include information, e.g. in addition to the network identifiers, that may be used by the data intercept module 255 to identify data that is being transmitted by, or action requests that are intended for, the devices 104A-C.

The modules 250-255 may operate, e.g. in conjunction with each other and/or one or more other components of the proxy device 102A, to process the data received from, and/or intercepted from, one or more of the devices 104A-C, and/or to process intercepted action requests intended for one or more of the devices 104A-C. In one or more implementations, the data intercept module 255 may monitor data transmitted through the proxy device 102A and/or over the network 101A, e.g. on a per-packet basis by performing deep packet inspection. The data intercept module 255 may identify data transmitted by one or more of the devices 104A-C and action requests intended for, e.g. addressed to, one or more of the devices 104A-C, such as for processing by one or more of the other modules 250-254. In one or more implementations, one or more of the devices 104A-C may be configured to transmit data directly to the proxy device 102A, and therefore the proxy device 102A may not intercept the data using the data intercept module 255. However, when one or more of the devices 102A-C transmits data intended for a device/application that is separate from the proxy device 102A, and/or when the proxy device 102A is operating in the network 101A transparently to the devices 102A-C, then the data intercept module 255 may intercept the data transmitted by the devices 102A-C, e.g. data that is not intended for and/or addressed to the proxy device 102A.

The device status module 250 may maintain a data structure, e.g. a lookup table in the memory 230, that indicates the statuses of the devices 104A-C. In one or more implementations, the devices 104A-C may transmit status messages, and/or state messages, to the proxy device 102A that indicate when the devices 104A-C are changing, and/or have changed, statuses and/or states. In one or more implementations, the devices 104A-C may transmit periodic messages, such as heartbeat messages, to the proxy device 102A when the devices 104A-C are powered on. In one or more implementations, the device status module 250 may proactively monitor the statuses of the devices 104A-C, e.g. by polling and/or pinging the devices 104A-C on a periodic basis. When the data intercept module 255 intercepts an action request intended for one of the devices 104A-C, such as the device 104A, the device status module 250 may retrieve the status of the device 104A, such as to determine whether the action request should be forwarded to the device 104A or handled by the proxy device 102A on behalf of the device 104A.

In one or more implementations, the anonymization module 251 may implement one or more anonymization policies, or privacy policies, to anonymize, randomize, and/or obfuscate data received from, and/or intercepted from, one or more of the devices 104A-C, e.g. based at least on the application/device to which the data is being transmitted. In one or more implementations, the anonymization module 251 may anonymize the data received so that the addresses and/or attributes of the data packets are randomized so that they cannot be identified, e.g. by creating an incorrect Internet Protocol (IP) Address within hypertext transfer protocol (HTTP) headers. In one or more implementations, the anonymization module 251 may also anonymize, randomize, and/or obfuscate the source of the data received from one or more of the devices 104A-C, e.g. such that the devices 104A-C are not identifiable from the data, e.g. privacy on each individual packet. In one or more implementations, the anonymization module 251 may obfuscate the actual data values measured by the devices 104A-C, e.g. biometric data, such that the data values may be used in aggregate with other similar data values, e.g. for reporting purposes, but such that an individual person is not identifiable from the data values themselves. For example, the anonymization module 251 may add noise to the data values.

In one or more implementations, the summarization module 252 may implement one or more summarization policies to aggregate data received from one or more of the devices 104A-C, e.g. based at least on an application/device that requested the data. In one or more implementations, the summarization module 252 may aggregate data that has a similar data type, and/or attribute, that was received and/or intercepted from one or more of the devices 104A-C, such as the device 104A, at different times, e.g. temperature data from the device 104C received at different times, and/or that was received from the device 104A across different networks, such as the networks 101A-D, 106. In one or more implementations, the summarization module 252 may combine data that has a similar data type, and/or attribute, that was received and/or intercepted from multiple devices 104A-C, such as video data received and/or intercepted from video cameras and/or smart phones in the network 101A. In one or more implementations, the summarization module 252 may aggregate data having different types and/or attributes received from one or more devices 104A-C, such as data relevant to, and/or requested by, an application or task. For example, the summarization module 252 may aggregate video data received from security cameras and door and/or window status data received from door and/or window sensors.

In one or more implementations, the extraction module 253 may implement one or more filter policies, e.g. on a per device basis and/or on a per application basis, to filter data received from, and/or intercepted from, one or more of the devices 104A-C. In one or more implementations, the extraction module 253 may operate to effectively provide remote processing resources to one or more of the devices 104A-C. For example, if a device 104A does not have processing resources to configure the periodicity of data transmissions, and the device 104A transmits data every millisecond while applications/devices have only requested the data every second, the extraction module 253 may forward data transmitted by the device 104A every second, while dropping the other data transmitted by the device 104A. Similarly, the extraction module 253 may drop data transmitted by the device 104A when the data is constant, e.g. when the difference, or delta, between the data does not satisfy a threshold. In one or more implementations, the extraction module 253 may identify redundancy of received data and may extract the non-redundant data based at least on one or more algorithms, such as algorithms identified in the corresponding filter policies. For example, the proxy device 102A may remove and/or drop one or more portions of redundant video data, e.g. entire redundant video frames and/or redundant portions of video frames, received from the device 104C, such as a video camera.

In one or more implementations, the emulation module 254 may implement one or more emulation policies to emulate the behavior of one or more of the devices 104A-C, such as the device 104A. In one or more implementations, an emulation policy for one or more of the devices 104A-C, such as the device 104A, may include a status criterion that indicates one or more statuses of the device 104A, such as offline, unavailable, low power mode, etc., for which the emulation policy should be applied. In one or more implementations, the emulation policy may include a cached data decay criterion, e.g. a time-to-live value, that may indicate when data cached by the proxy device 102A that was generated by the device 104A may be decayed, or out-of-date. When cached data has decayed, the emulation policy may also indicate whether the emulation module 254 should request updated data from the device 104A, estimate an updated value for the data, or perform some other action. In one or more implementations, the emulation module 254 may estimate an updated value for the data based at least on a model, such as an experimental model and/or a theoretical model, of the behavior of the device 104A, such as an experimental model based at least on data previously transmitted by the device 104A.

In one or more implementations, one or more of the modules 250-255 may be implemented in software (e.g., subroutines and code). In one or more implementations, one or more of the modules 250-255 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 3:
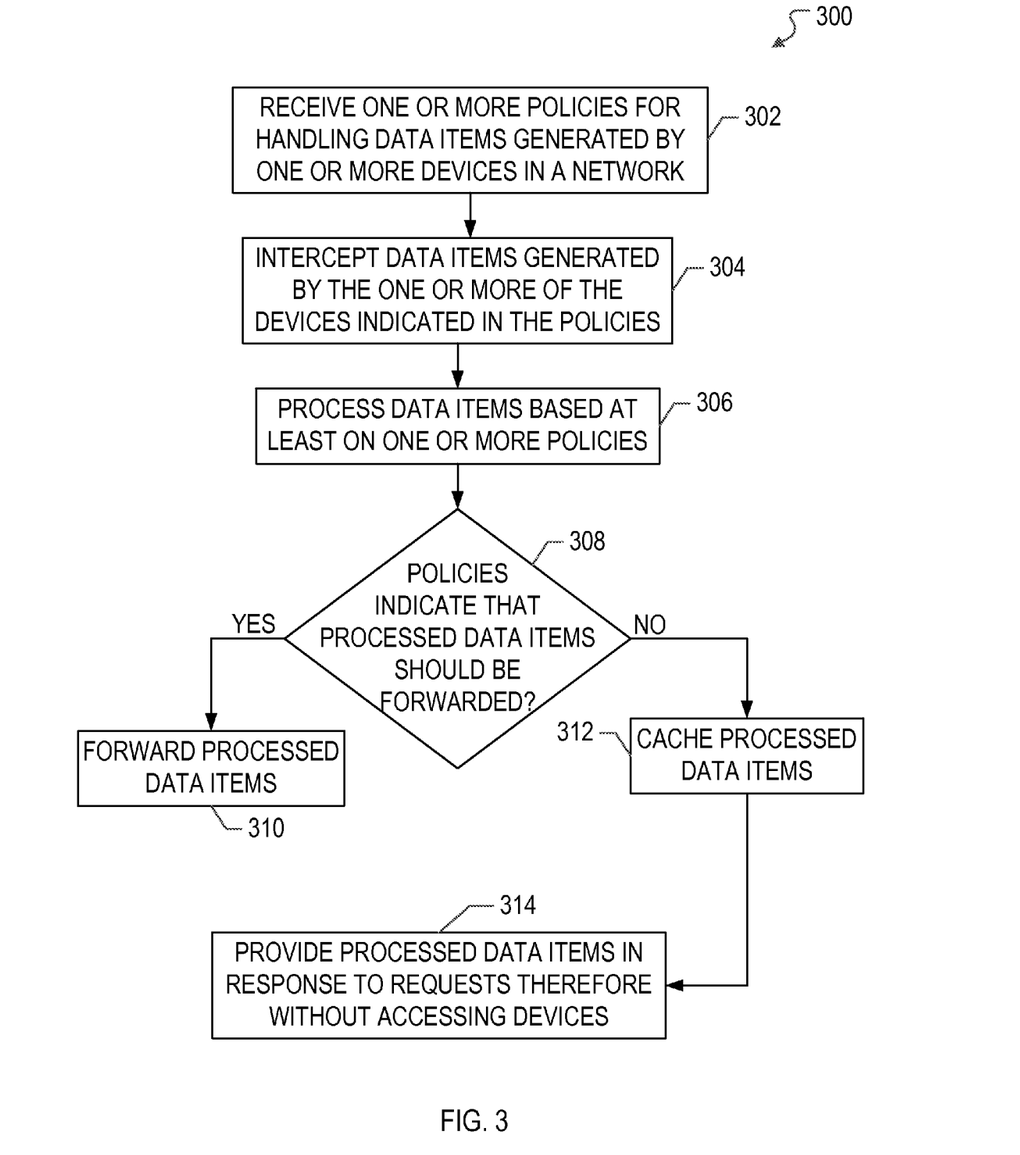
FIG. 3 illustrates a flow diagram of an example process of a proxy device for a network of devices in accordance with one or more implementations.

FIG. 3 illustrates a flow diagram of an example process 300 of a proxy device 102A for a network 101A of devices 104A-C in accordance with one or more implementations. For explanatory purposes, the example process 300 is primarily described herein with reference to components of the proxy device 102A of FIGS. 1 and 2; however, the example process 300 is not limited to the proxy device 102A of FIGS. 1 and 2, and the example process 300 may be performed by one or more of the other proxy devices 102B-D and/or other components of the proxy device 102A. Further for explanatory purposes, the blocks of the example process 300 are described herein as occurring in serial, or linearly. However, multiple blocks of the example process 300 may occur in parallel. In addition, the blocks of the example process 300 may be performed a different order than the order shown and/or one or more of the blocks of the example process 300 may not be performed.

The proxy device 102A receives one or more policies for handling data items generated by one or more of the devices 104A-C in the network 101A (302). In one or more implementations, the proxy device 102A may receive one or more policies from applications and/or devices, such as applications and/or devices that are requesting and/or have requested data items generated by one or more of the devices 104A-C. In one or more implementations, the policies may include an identifier, such as a network identifier, associated with the requesting application and/or device, and/or an identifier of the one or more devices 104A-C to which the policy applies. In one or more implementations, the policies may include one or more of an anonymization policy, a summarization policy, a filter policy, an emulation policy, or generally any other policy that may be indicative of how the proxy device 102A should handle data items generated by one or more of the devices 104A-C. In one or more implementations, multiple of the policies may apply to data items generated by one the devices 104A-C, such as the device 104A. For example, a first anonymization policy may apply to data items generated by the device 104A with respect to a first requesting device, a second anonymization policy may apply to data items generated by the device 104A with respect to a second requesting device, and a filter policy may apply to data items generated by the device 104A with respect to a third requesting device.

In one or more implementations, the proxy device 102A may receive a request for data items generated by one or more of the devices 104A-C, rather than a policy for handling the data items, and the proxy device 102A may generate one or more of the policies based at least on the requests, such as to reduce bandwidth, power, and/or processing resources used by one or more of the devices 104A-C. In one or more implementations, the proxy device 102A may generate one or more of the policies irrespective of requests and/or policies received from requesting applications/devices, e.g. based at least on heuristics and/or behavior models associated with one or more of the devices 104A-C, such as to reduce bandwidth, power, and/or processing resources used by one or more of the devices 104A-C.

The proxy device 102A intercepts data items, such as measurements of physical quantities, generated by the one or more devices 104A-C indicated in the one or more policies (304). In one or more implementations, the data intercept module 255 of the proxy device 102A may utilize deep packet inspection to identify and intercept packets transmitted by the one or more devices 104A-C indicated in the one or more policies (e.g. based at least on network identifiers associated with the one or more devices 104A-C) while allowing other packets to pass through. In one or more implementations, one or more of the devices 104A-C indicated in the policies may be configured to transmit generated data items directly to the proxy device 102A, and therefore the proxy device 102A may not intercept these packets.

The proxy device 102A processes the intercepted data items based at least on the one or more policies (306). In one or more implementations, the data items may be processed by one or more of the anonymization module 251, the summarization module 252, the extraction module 253, and/or the emulation module 254. In one or more implementations, the one or more policies may indicate whether the processed data items should be forwarded to the requesting application/device or cached until they are requested by the requesting application/device.

For policies that indicate that the processed data items should be forwarded to the requesting application/device (308), the proxy device 102A forwards the processed data items to the requesting application/device (310). For the policies that indicate that the processed data items should be cached until requested by the requesting application/device, the proxy device 102A caches the processed data items (312), such as in the memory 230. The proxy device 102A then provides the cached processed data items in response to requests therefor from the requesting applications/devices without accessing the devices 104A-C (314).

In one or more implementations, the proxy device 102A may receive a request, e.g. from an application and/or device via the network 106, to periodically provide temperature values generated by one or more of the devices 104A-C, such as the device 104C. The proxy device 102A may generate one or more policies based at least on the received request, such as a summarization policy and/or a filter policy based at least on the periodicity at which the requesting application/device has requested the temperature values, and/or an anonymization policy based at least on whether the requesting application and/or device is not authorized to receive source-identifiable data from the device 104C. For example, the anonymization policy may indicate that the proxy device 102A should hide the IP address of the device 104C. The proxy device 102A may receive and/or intercept temperature values generated by the device 104C, and/or the proxy device 102A may request temperature values generated by the device 104C periodically throughout the day, such as four times per day. The proxy device 102A may forward and/or cache the processed temperature values based at least on the one or more policies without accessing the device 104A. For example, the proxy device 102A may drop temperature values that are substantially the same as the last cached temperature value, e.g. within a threshold amount, and the proxy device 102A may cache and/or forward temperature values that differ from the last cached temperature value by at least the threshold amount.

Figure 4:
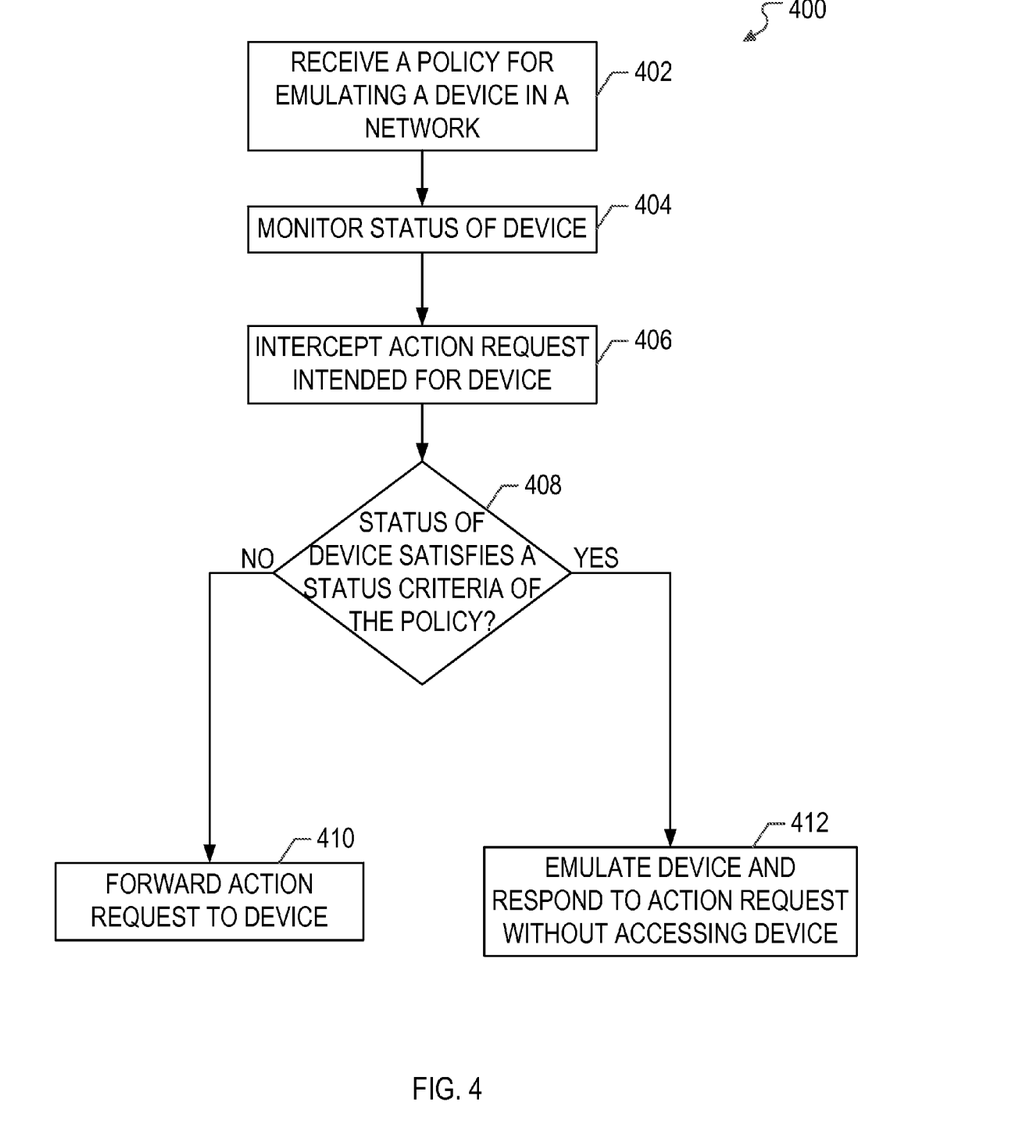
FIG. 4 illustrates a flow diagram of an example process of a proxy device for a network of devices in accordance with one or more implementations.

FIG. 4 illustrates a flow diagram of an example process 400 of a proxy device 102A for a network 101A of devices 104A-C in accordance with one or more implementations. For explanatory purposes, the example process 400 is primarily described herein with reference to components of the proxy device 102A of FIGS. 1 and 2; however, the example process 400 is not limited to the proxy device 102A of FIGS. 1 and 2, and the example process 400 may be performed by one or more of the other proxy devices 102B-D and/or other components of the proxy device 102A. Further for explanatory purposes, the blocks of the example process 400 are described herein as occurring in serial, or linearly. However, multiple blocks of the example process 400 may occur in parallel. In addition, the blocks of the example process 400 may be performed a different order than the order shown and/or one or more of the blocks of the example process 400 may not be performed.

The proxy device 102A receives a policy for emulating one or more of the devices 104A-C in the network 101A, such as the device 104A (402). In one or more implementations, the policy may include a status criterion that indicates one or more statuses of the device 104A, such as offline, unavailable, low power mode, etc., for which the policy applies. In one or more implementations, the proxy device 102A may receive the policy from the device 104A and/or from an application and/or device (internal and/or external to the network 101A) requesting data generated by the device 104A. In one or more implementations, the proxy device 102A may generate all or part of the policy based at least on a request for data and/or policy received from a requesting application and/or device. In one or more implementations, the proxy device 102A may generate all or part of the policy irrespective of requests and/or policies received from requesting applications/devices, e.g. based at least on heuristics and/or behavior models associated with the device 104A, such as to reduce bandwidth, power, and/or processing resources used by the device 104A.

The proxy device 102A monitors and stores the status of the device 104A (404). In one or more implementations, the device status module 250 of the proxy device 102A may receive the status from the device 104A, e.g. transmitted asynchronously and/or periodically by the device 104A, and/or transmitted at the request of the device status module 250 of the proxy device 102A. In one or more implementations, the device status module 250 of the proxy device 102A may proactively monitor the status of the device 104A, e.g. by periodically pinging the device 104A. The device status module 250 of the proxy device 102A may store the status of the device 104A in the memory 230.

The proxy device 102A may intercept an action request intended for the device 104A (406). For example, the data intercept module 255 of the proxy device 102A may utilize deep packet inspection, and/or packet header inspection, to identify and intercept action requests intended for the device 104A. An action request intended for the device 104A may include any request by an application and/or device for an action to be performed by the device 104A, such as a request for the device 104A to transmit data, a request for the device 104A to perform an action and/or trigger another device 104B-C, such as an actuator, to perform an action, or generally any request for an action to be performed by the device 104A.

The proxy device 102A determines whether the status of the device 104A satisfies the status criterion of the policy (408). In one or more implementations, the proxy device 102A may retrieve the status of the device 104A from the memory 230, e.g. as monitored and stored by the device status module 250. In one or more implementations, the proxy device 102A may request the status of the device 104A and/or proactively determine the status of the device 104A, in response to intercepting the action request. In one or more implementations, if the policy includes a requesting application and/or device criterion, the proxy device 102A may further determine whether the application and/or device that transmitted the action request satisfies the requesting application and/or device criterion.

If the proxy device 102A determines that the status of the device 104A does not satisfy the status criterion of the policy (408), the proxy device 102A forwards the action request to the device 104A (410). In one or more implementations, the proxy device 102A may also forward the action request to the device 104A when the application and/or device that transmitted the action request does not satisfy a requesting application and/or device criterion of the policy.

If the proxy device 102A determines that the status of the device 104A satisfies the status criterion of the policy (408), the proxy device 102A emulates the device 104A and responds to the action request without accessing the device 104A (412). The proxy device 102A may respond to the action request such that the response appears to the requesting application and/or device to have been transmitted by the device 104A. For example, the proxy device 102A may insert a network identifier associated with the device 104A as the source address for the response.

In one or more implementations, the proxy device 102A may transmit cached data generated by the device 104A to the requesting application and/or device. In one or more implementations, if the amount of time that the data has been cached exceeds a threshold amount of time, the proxy device 102A may estimate an updated value for the data, such as based at least on a model of the behavior of the device 104A, e.g. previous data generated by the device 104A and/or similar devices 102B-C. In one or more implementations, the proxy device 102A may respond to the action request by triggering another one of the devices 102B-C that is available to perform the requested action, and/or the proxy device 102A may perform the requested action itself. In one or more implementations, if the proxy device 102A is unable to complete the requested action on behalf of the device 104A, the proxy device 102A may transmit a message to the requesting application and/or device that indicates that the requested action cannot be completed at this time.

In one or more implementations, the proxy device 102A may also determine a time when the device 104A is expected to become available, e.g. based at least on experimental and/or theoretical behavior models associated with the device 104A, and the proxy device 102A may indicate to the requesting application and/or device the time at which the device 104A is expected to become available. In this manner, the requesting application and/or device can wait until the expected time before retransmitting the action request, rather than repeatedly retransmitting the action request.

Figure 5:
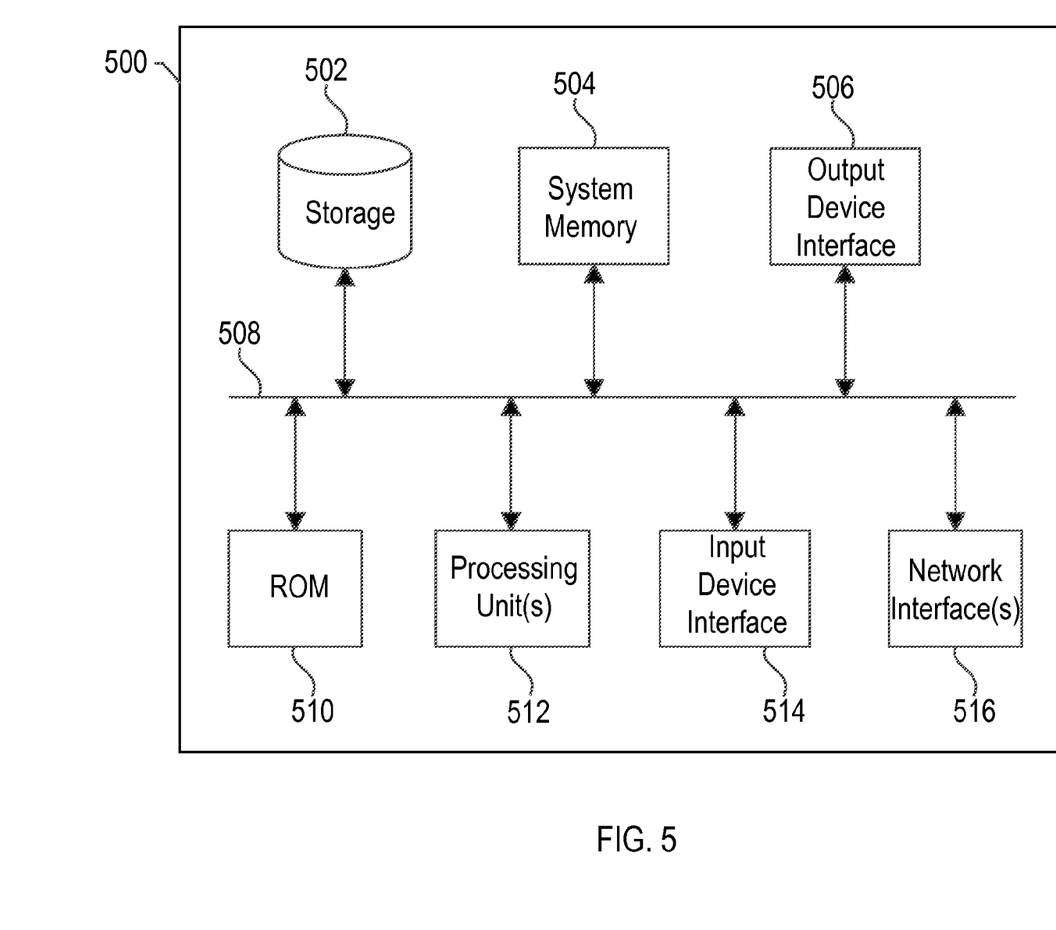
FIG. 5 conceptually illustrates an example electronic system with which one or more implementations of the subject technology can be implemented.

FIG. 5 conceptually illustrates an example electronic system 500 with which one or more implementations of the subject technology can be implemented. The electronic system 500, for example, can be a gateway device, a set-top box, a desktop computer, a laptop computer, a tablet computer, a server, a switch, a router, a base station, a receiver, a phone, a personal digital assistant (PDA), and/or generally any electronic device that transmits signals over a network. The electronic system 500 can be, and/or can be a part of, one or more of the proxy devices 102A-D and/or one or more of the devices 104A-L. Such an electronic system 500 includes various types of computer readable media and interfaces for various other types of computer readable media. The electronic system 500 includes a bus 508, one or more processing unit(s) 512, a system memory 504, a read-only memory (ROM) 510, a permanent storage device 502, an input device interface 514, an output device interface 506, one or more network interface(s) 516, and/or subsets and variations thereof.

The bus 508 collectively represents all system, peripheral, and chipset buses that communicatively connect the numerous internal devices of the electronic system 500. In one or more implementations, the bus 508 communicatively connects the one or more processing unit(s) 512 with the ROM 510, the system memory 504, and the permanent storage device 502. From these various memory units, the one or more processing unit(s) 512 retrieve instructions to execute and data to process in order to execute the processes of the subject disclosure. The one or more processing unit(s) 512 can be a single processor or a multi-core processor in different implementations.

The ROM 510 stores static data and instructions that are utilized by the one or more processing unit(s) 512 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory (RAM). The system memory 504 may store one or more of the instructions and/or data that the one or more processing unit(s) 512 may utilize at runtime. In one or more implementations, the processes of the subject disclosure are stored in the system memory 504, the permanent storage device 502, and/or the ROM 510. From these various memory units, the one or more processing unit(s) 512 retrieve instructions to execute and data to process in order to execute the processes of one or more implementations.

The bus 508 also connects to the input and output device interfaces 514 and 506. The input device interface 514 enables a user to communicate information and select commands to the electronic system 500. Input devices that may be used with the input device interface 514 may include, for example, alphanumeric keyboards and pointing devices (also called "cursor control devices"). The output device interface 506 may enable, for example, the display of images generated by the electronic system 500. Output devices that may be used with the output device interface 506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 5, bus 508 also couples electronic system 500 to one or more networks (not shown) through one or more network interface(s) 516. The one or more network interface(s) may include an Ethernet interface, a WiFi interface, a multimedia over coax alliance (MoCA) interface, a reduced gigabit media independent interface (RGMII), or generally any interface for connecting to a network. In this manner, electronic system 500 can be a part of one or more networks of computers (such as a local area network (LAN), a wide area network (WAN), or an Intranet, or a network of networks, such as the Internet. Any or all components of electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (e.g., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A proxy device for a network of devices, the proxy device comprising:
    at least one processor circuit configured to:
        receive a policy for emulating another device in a network, wherein the policy comprises a status criterion that indicates a status of the another device for which the policy applies;
        receive an action request associated with the another device;
        forward at least a portion of the action request to the another device when the status of the another device does not satisfy the status criterion;
        emulate the another device by transmitting a response to the action request on behalf of the another device, without accessing the another device, when the status of the another device satisfies the status criterion;
        forward, to a server, data items received from the another device without receiving a request from the server therefor; and
        anonymize at least some of the data items received from the another device before forwarding the data items to the server.

2. The proxy device of claim 1, wherein the at least one processor circuit is further configured to monitor the status of the another device.

3. The proxy device of claim 1, wherein the at least one processor circuit is further configured to:
    receive the status of the another device from the another device; and
    poll the another device to determine the status of the another device.

4. The proxy device of claim 1, wherein the action request is received from a requesting device via a cloud of computers and the at least one processor circuit is further configured to:
    retrieve a cached data item generated by the another device; and
    transmit, via the cloud of computers, the cached data item to the requesting device such that the cached data item appears to have been transmitted by the another device.

5. The proxy device of claim 4, wherein the response comprises a network identifier of the another device.

6. The proxy device of claim 5, wherein the at least one processor circuit is further configured to:
    insert the network identifier of the another device into a source address field of the response.

7. The proxy device of claim 1, wherein the status of the another device satisfies the status criterion when the another device is offline or unavailable.

8. A method of proxying for a device of a network, the method comprising:
    receiving a policy for emulating a device in a network, wherein the policy comprises a status criterion that indicates a status of the device for which the policy applies;
    receiving, from a requesting device and via a cloud of computers, an action request associated with the device;
    forward at least a portion of the action request to the device when the status of the device does not satisfy the status criterion;
    emulate the device by transmitting, to the requesting device via the cloud of computers, a response to the action request on behalf of the device, without accessing the device, when the status of the device satisfies the status criterion;

forward, to a server, data items received from the device without receiving a request from the server therefor; and anonymize at least some of the data items received from the device before forwarding the data items to the server.

9. The method of claim 8, further comprising:
monitoring the status of the device.

10. The method of claim 8, further comprising at least one of:
receiving the status of the device from the device; or
polling the device to determine the status of the device.

11. The method of claim 8, further comprising:
retrieving a cached data item generated by the device; and
transmitting, via the cloud of computers, the cached data item to the requesting device such that the cached data item appears to have been transmitted by the device.

12. The method of claim 11, wherein the response comprises a network identifier of the device.

13. The method of claim 12, further comprising:
inserting the network identifier of the device into a source address field of the response.

14. The method of claim 8, wherein the status of the device satisfies the status criterion when the device is offline or unavailable.

15. The method of claim 8, further comprising:
forwarding, to the cloud of computers, data items received from the device responsive to receiving the data items from the device.

16. A computer program product comprising instructions stored in a tangible computer-readable storage medium, the instructions comprising:
instructions to receive a policy for emulating a device in a network, wherein the policy comprises a status criterion that indicates when the policy applies;
instructions to receive an action request associated with the device;
instructions to forward at least a portion of the action request to the device when the status criterion indicates that the policy does not apply;
instructions to emulate the device by transmitting a response to the action request on behalf of the device, without accessing the device, when the status criterion indicates that the policy applies;
instructions to forward, to a server, data items received from the device without receiving a request from the server therefor; and
instructions to anonymize at least some of the data items received from the device before forwarding the data items to the server.

17. The computer program product of claim 16, wherein the instructions further comprise at least one of:
instructions to receive the status of the device from the device; or
instructions to poll the device to determine the status of the device.

18. The computer program product of claim 16, wherein the status criterion indicates that the policy applies when the status of the device indicates that the device is unavailable.

* * * * *